Figure 1:
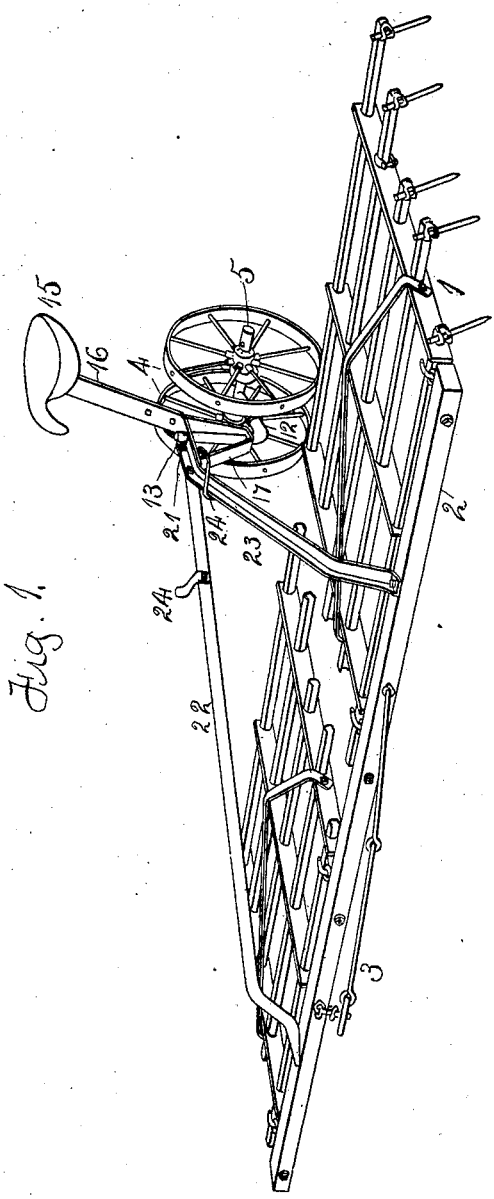

No. 830,690. PATENTED SEPT. 11, 1906.
L. E. WATERMAN.
RIDING ATTACHMENT FOR AGRICULTURAL IMPLEMENTS.
APPLICATION FILED JAN. 4, 1906.
2 SHEETS—SHEET 1.

Witnesses
C. B. Clark
E. Behel.

Inventor
Lewis E. Waterman.
By A. O. Behel
Attorney

No. 830,690. PATENTED SEPT. 11, 1906.
L. E. WATERMAN.
RIDING ATTACHMENT FOR AGRICULTURAL IMPLEMENTS.
APPLICATION FILED JAN. 4, 1906.
2 SHEETS—SHEET 2.
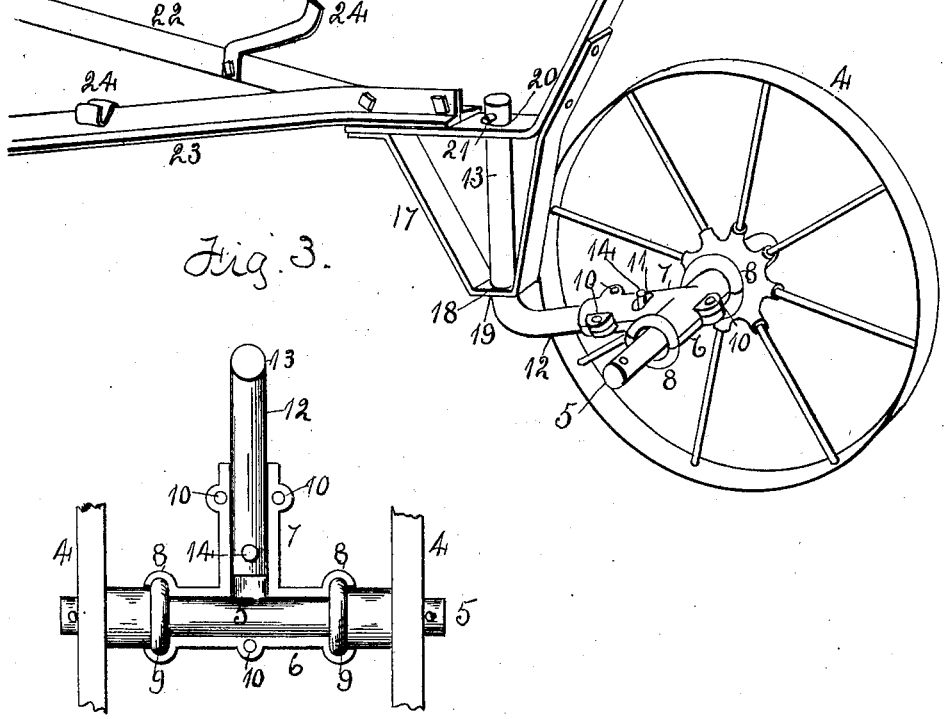
Witnesses:
C. B. Clark
E. Behel.
Inventor:
Lewis E. Waterman.
By A. O. Behel
Attys.
THE NORRIS PETERS CO., WASHINGTON, D. C.

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

RIDING ATTACHMENT FOR AGRICULTURAL IMPLEMENTS.

No. 830,690.  Specification of Letters Patent.  Patented Sept. 11, 1906.

Application filed January 4, 1906. Serial No. 294,639.

*To all whom it may concern:*

Be it known that I, LEWIS E. WATERMAN, a citizen of the United States, residing at Rockford, in the county of Winnebago and State of Illinois, have invented certain new and useful Improvements in Riding Attachments for Agricultural Implements, of which the following is a specification.

The object of this invention is to provide a riding attachment for agricultural implements which permits of an oscillatory movement of the wheels with respect to their support in order that the wheels may conform to the unevenness of the ground.

In the accompanying drawings, Figure 1 is a perspective view of a harrow with my riding attachment connected therewith. Fig. 2 is a perspective view of the riding attachment as seen from the rear with one wheel removed. Fig. 3 is a plan view of the wheel portion of the riding attachment with the cap of the center connection removed.

The agricultural implement with which my improvements are shown in connection is a harrow 1 of the usual construction and is provided with the evener 2, to which the horses are attached by the chains 3.

The riding attachment is supported at one end by the wheels 4. These wheels are located on an axle and are held the proper distance apart by a center connection composed of the section 6, embracing the axle 5, and a section 7, extending at right angles thereto and forwardly therefrom. The section 6 has its ends formed with annular grooves 8, which receive annular projections 9, extending from the wheel-hubs. This connection is clamped to the axle by the bolts 10. The section 7 is tubular and has a transverse slot 11. A cylindrical bar-support has its two portions 12 and 13 located at right angles to one another. The portion 12 has its free end portion located in the tubular section 7, and a pin 14 passes through it and is located in the slot 11 in the tubular portion. A seat-support 16 has a seat 15 connected to its upper end. To the seat-support is connected a depending frame 17, having an opening 18 in its bottom section 19. The portion 13 of the support for the wheels is located in the opening 18 in the frame and in an opening 20 in the seat-support 16. A pin 21 passes through the upper end of the portion 13 and is located above the seat-support, which holds the portion 13 in connection with the seat-support and frame 17 in a manner to permit the wheels to caster around the portion 13 as a center.

To the seat-support are connected two arms 22 and 23, which extend over the harrow and are connected to the evener 2. The arms 22 and 23 support foot-rests 24.

With the driver located in the seat 10 he is able to control the team and the workings of the harrow.

The slot 11 will permit the wheels to oscillate around the portion 12 as a center, in order that the wheels may conform to the unevenness of the ground without severely jolting the driver.

I claim as my invention—

1. A riding attachment comprising an axle, two wheels supporting the axle, a seat-supporting frame, and a swivel and an oscillatory connection between the axle and seat-supporting frame.

2. A riding attachment comprising a wheel-frame and a seat-frame, a shaft having horizontal and vertical portions, an oscillating connection between the horizontal portion and the wheel-frame and a swivel connection between the vertical portion and the seat-frame.

LEWIS E. WATERMAN.

Witnesses:
 A. O. BEHEL,
 E. BEHEL.